US012726379B2

(12) United States Patent
Zhuang et al.

(10) Patent No.: US 12,726,379 B2
(45) Date of Patent: Sep. 1, 2026

(54) METHOD AND DEVICE FOR FILTERING BROADCAST DATA, TERMINAL EQUIPMENT, AND STORAGE MEDIUM

(71) Applicant: SHENZHEN MINEW TECHNOLOGIES CO LTD, Shenzhen (CN)

(72) Inventors: Yan Zhuang, Shenzhen (CN); Ji Guo, Shenzhen (CN)

(73) Assignee: SHENZHEN MINEW TECHNOLOGIES CO LTD, Shenzhen (CN)

( * ) Notice: Subject to any disclaimer, the term of this patent is extended or adjusted under 35 U.S.C. 154(b) by 370 days.

(21) Appl. No.: 18/388,622

(22) Filed: Nov. 10, 2023

(65) Prior Publication Data

US 2024/0163128 A1 May 16, 2024

(30) Foreign Application Priority Data

Nov. 10, 2022 (CN) ......................... 202211405307.0

(51) Int. Cl.
*H04L 12/18* (2006.01)

(52) U.S. Cl.
CPC ........ *H04L 12/1886* (2013.01); *H04L 12/189* (2013.01)

(58) Field of Classification Search
CPC ............... H04L 12/1886; H04L 12/189; H04L 12/1881; Y02D 30/70
See application file for complete search history.

(56) References Cited

U.S. PATENT DOCUMENTS

2007/0124368 A1* 5/2007 Weiser ................... G08B 27/00 370/310
2011/0103391 A1* 5/2011 Davis .................... H04L 49/253 370/400
(Continued)

FOREIGN PATENT DOCUMENTS

CA 2626110 A1 * 4/2007 ............ H04W 48/10
CN 101741566 A * 6/2010
(Continued)

OTHER PUBLICATIONS

Chinese Office Action corresponding to CN Application No. 202211405307.0; Issue date, May 24, 2025, 21 pages.

*Primary Examiner* — Sujoy K Kundu
*Assistant Examiner* — Vladislav Y Agureyev
(74) *Attorney, Agent, or Firm* — CANTOR COLBURN LLP

(57) ABSTRACT

A method and for filtering broadcast data, which is applied to a gateway and includes steps of: obtaining a current broadcast message broadcast by a piece of terminal equipment; determining signature information of current broadcast data in the current broadcast message; comparing the signature information corresponding to the current broadcast message with signature information corresponding to various valid broadcast messages received by the gateway to determine whether a first valid broadcast message being the same as the current broadcast message is presented in the various valid broadcast messages. If the first valid broadcast message is presented, the current broadcast message is determined to be a duplicate broadcast message, and the current broadcast message is discarded; if the first valid broadcast message is not presented, the current broadcast message is determined to be a newly-received valid broadcast message.

17 Claims, 5 Drawing Sheets

(56) References Cited

U.S. PATENT DOCUMENTS

2014/0162544 A1 6/2014 Edge
2014/0162545 A1 6/2014 Edge
2014/0162687 A1 6/2014 Edge
2014/0162688 A1 6/2014 Edge
2015/0156107 A1* 6/2015 Li .................... H04L 12/1877
370/230
2016/0381509 A1 12/2016 Edge
2017/0070847 A1* 3/2017 Altman .................. H04W 4/80
2017/0091699 A1 3/2017 Mueller
2018/0176341 A1* 6/2018 Stefan ............... H04L 12/40176
2019/0014497 A1 1/2019 Turon
2019/0246260 A1* 8/2019 Edge ...................... H04L 51/58
2019/0296969 A1* 9/2019 Zimny .................. H04W 12/03
2020/0178250 A1* 6/2020 Freed .................. H04W 72/542
2020/0296658 A1* 9/2020 Li ........................ H04W 48/12
2022/0171448 A1* 6/2022 Wu .................... H04L 12/1886

FOREIGN PATENT DOCUMENTS

CN 103188084 A 7/2013
CN 104937898 A 9/2015
CN 113163346 A 7/2021
CN 115225921 A * 10/2022 ......... G06F 16/9535
EP 1961158 B1 * 5/2013 ............ G08B 27/00
EP 3622699 B1 * 11/2023 ........... H04L 45/745
KR 20140090208 A * 7/2014 ............. H04W 4/06
WO WO-2012108803 A1 * 8/2012 ............ H04W 72/30
WO 2014153982 A1 10/2014

* cited by examiner

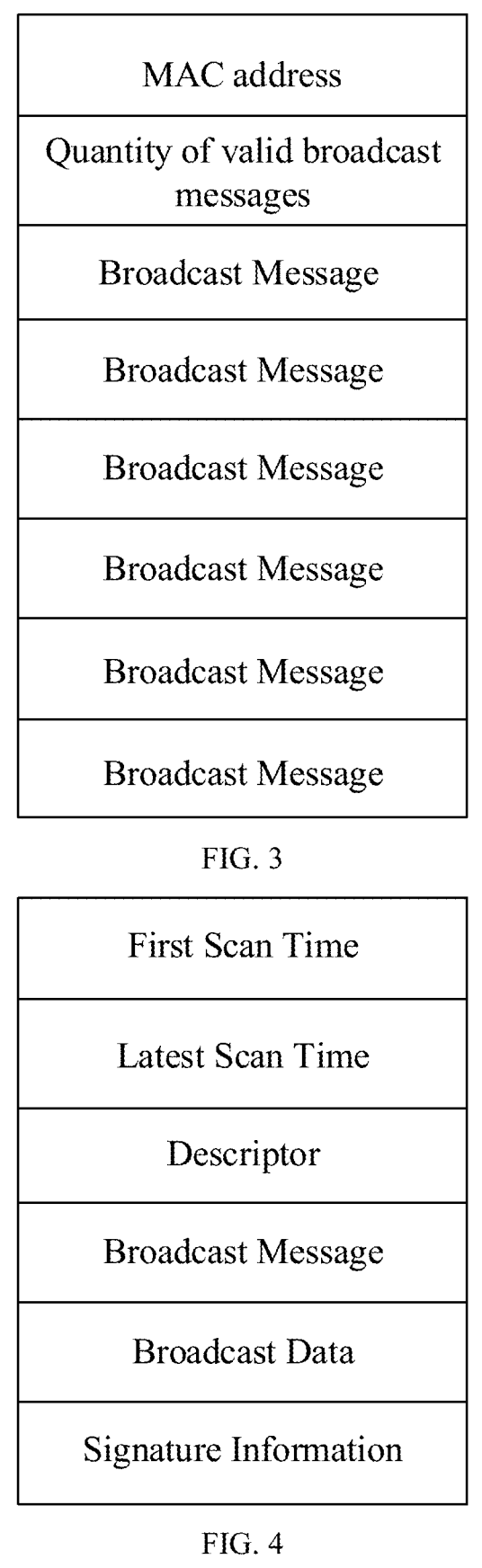

| MAC address |
| --- |
| Quantity of valid broadcast messages |
| Broadcast Message |
| Broadcast Message |
| Broadcast Message |
| Broadcast Message |
| Broadcast Message |
| Broadcast Message |

FIG. 3

| First Scan Time |
| --- |
| Latest Scan Time |
| Descriptor |
| Broadcast Message |
| Broadcast Data |
| Signature Information |

FIG. 4

700
Terminal Equipment
720
Memory
721
Computer Program
710
Processor

METHOD AND DEVICE FOR FILTERING BROADCAST DATA, TERMINAL EQUIPMENT, AND STORAGE MEDIUM

CROSS-REFERENCE TO RELATED APPLICATION

Pursuant to 35 U.S.C. § 119 and the Paris Convention, this application claims the benefit of Chinese Patent Application No. 202211405307.0 filed on Nov. 10, 2022, the content of which is incorporated herein by reference.

TECHNICAL FIELD

The present application relates to the field of data processing technology, and in particular, to a method and a device for filtering broadcast data, a piece of terminal equipment, and a storage medium.

BACKGROUND

The statements provided herein are merely background information related to the present application, and do not necessarily constitute any prior arts. BLE (Bluetooth Low Energy) technology has advantages, such as, a shortened wireless start-up time, a quick establishing of connections, and a reduction of peak power consumption for receiving and transmitting. BLE technology is widely used in data transmission between Bluetooth devices and mobile devices such as mobile phones, laptops, PADs, etc.

In related technologies, after data broadcast by a Bluetooth device is scanned by the gateway, the broadcast data needs to be reported to the gateway, and then reported by the gateway to the server. However, the Bluetooth device may send duplicate broadcast data within a certain period of time. If all the scanned broadcast data are indiscriminately sent to the server, the server will be caused to process a large amount of duplicate broadcast data multiple times, which will then increase the server's operating burden and reduces the server's processing efficiency.

SUMMARY

Embodiments of the present application provide a method and a device for filtering broadcast data, a piece of terminal equipment, and a storage medium, which can solve the problem that the Bluetooth device may send duplicate broadcast data within a certain period of time, and if all the scanned broadcast data are sent to the server, it will cause the server to process a large amount of duplicate broadcast data multiple times, which then will increases the server's operating burden and reduces the server's processing efficiency.

In accordance with a first aspect of the embodiments of the present application, a method for filtering broadcast data is provided, which is applied to a gateway, and includes steps of: obtaining a current broadcast message broadcast by a piece of terminal equipment, where the current broadcast message includes current broadcast data; performing a signature processing on the current broadcast data to determine signature information corresponding to the current broadcast data; comparing the signature information corresponding to the current broadcast message with signature information corresponding to various valid broadcast messages received by the gateway to determine whether a first valid broadcast message being the same as the current broadcast message is presented in the various valid broadcast messages; determining, when the first valid broadcast message is presented, that the current broadcast message is a duplicate broadcast message, and discarding the current broadcast message; and determining, when the first valid broadcast message is not presented, that the current broadcast message is a newly-received valid broadcast message.

Optionally, in a possible implementation of the first aspect, the current broadcast message also includes a MAC address corresponding to the current broadcast message, the MAC address is a MAC address of the terminal equipment, and a cache of the gateway contains The data storage units corresponding to the MAC address of the various valid broadcast messages, and the step of comparing the signature information corresponding to the current broadcast message with the signature information corresponding to the various valid broadcast messages received by the gateway to determine whether the first valid broadcast message being the same as the current broadcast message is presented in the various valid broadcast messages includes that: determining whether a first data storage unit matching with the MAC address that corresponds to the current broadcast message is presented in the various data storage units; comparing, when the first data storage unit is presented, the signature information corresponding to the current broadcast message with the signature information corresponding to the various valid broadcast messages stored in the first data storage unit to determine whether the first valid broadcast message is presented.

Optionally, in a possible implementation of the first aspect, after the above determination of whether the first data storage unit matching with the MAC address that corresponds to the current broadcast message is presented in the various data storage units, the method further includes steps of: creating, when the first data storage unit is not presented, a new data storage unit corresponding to the MAC address that corresponds to the current broadcast message; storing the current broadcast message as the newly-received valid broadcast message in the newly-created data storage unit.

Optionally, in a possible implementation of the first aspect, after determining, when the first valid broadcast message is not presented, that the current broadcast message is a newly-received valid broadcast message, the method also includes a step of: storing the current broadcast message as the newly-received valid broadcast data in the first data storage unit.

Optionally, in a possible implementation of the first aspect, the current broadcast message also includes current scan time, the valid broadcast message has corresponding first scan time and latest scan time, after the above step of comparing, when the first data storage unit is presented, the signature information corresponding to the current broadcast message with the signature information corresponding to the various valid broadcast messages stored in the first data storage unit to determine whether the first valid broadcast message is presented, the method also includes steps of: updating, when the first valid broadcast message is presented, the latest scan time corresponding to the first valid broadcast message to the current scan time; storing, when the first valid broadcast message is not presented, the current scan time, taken as the first scan time and the latest scan time corresponding to the current broadcast message, in the first data storage unit.

Optionally, in a possible implementation of the first aspect, the step of storing the current broadcast message as newly-received valid broadcast data in the first data storage unit includes that: determining whether a quantity of valid broadcast messages in the first data storage unit is equal to a quantity threshold; sending, when the quantity of valid broadcast messages is equal to the quantity threshold, a corresponding second valid broadcast message having an earliest valid broadcast message of the first scan time in the first data storage unit to a server, and deleting the second valid broadcast message from the first data storage unit; storing the current broadcast message into the first data storage unit; and storing, when the quantity of valid broadcast messages is less than the quantity threshold, the current broadcast message in the first data storage unit, and adding the quantity of valid broadcast messages by 1.

Optionally, in a possible implementation of the first aspect, the above method for filtering broadcast data also includes steps of: determining a time interval between the first scan time corresponding to each valid broadcast message and a current moment; sending a third valid broadcast message whose time interval between the first scan time and the current moment is greater than or equal to a preset filtering period to a server; and deleting the third valid broadcast message from a data storage unit where the third valid broadcast message is stored, and subtracting a quantity of the third valid broadcast message from the quantity of valid broadcast messages corresponding to the data storage unit where the third valid broadcast message is stored.

Optionally, in a possible implementation of the first aspect, before the step of performing the signature processing on the current broadcast data to determine the signature information corresponding to the current broadcast data, the method also includes steps of: determining whether the current broadcast message meets a pre-filtering rule; and discarding the current broadcast message when the current broadcast message meets the pre-filtering rule.

Optionally, in a possible implementation of the first aspect, the current broadcast message also includes a MAC address corresponding to the current broadcast message, the MAC address is a MAC address of the terminal equipment, the pre-filtering rule include a preset address range, and the above step of determining whether the current broadcast message meets the pre-filtering rule includes that: determining, in case that the MAC address corresponding to the current broadcast message is within the preset address range, that the current broadcast message meets the pre-filtering rule; determining, in case that the MAC address corresponding to the current broadcast message is not within the preset address range, that the current broadcast message does not meet the pre-filtering rule.

Optionally, in a possible implementation of the first aspect, the current broadcast message also includes a descriptor corresponding to the current broadcast message, the descriptor includes a received signal strength indication value, and the pre-filtering rule includes a preset range of the received signal strength indication value, and the above step of determining whether the current broadcast message meets the pre-filtering rule includes that: determining, in case that the received signal strength indication value corresponding to the current broadcast message is within the preset range of the received signal strength indication value, that the current broadcast message meets the pre-filtering rule; and determining, in case that the received signal strength indication value corresponding to the current broadcast message is not within the preset range of the received signal strength indication value, that the current broadcast message does not meet the pre-filtering rule.

Optionally, in a possible implementation of the first aspect, the above descriptor also includes a broadcast type, the above pre-filtering rules include a preset broadcast type, and the above step of determining whether the current broadcast message meets the pre-filtering rule includes that: determining, in case that the broadcast type corresponding to the current broadcast message belongs to the preset broadcast type, that the current broadcast message meets the pre-filtering rule; and determining, in case that the broadcast type corresponding to the current broadcast message does not belong to the preset broadcast type, that the current broadcast message does not meet the pre-filtering rule.

In accordance with a second aspect of the embodiments of the present application, a device for filtering broadcast data is provided, which applied to a gateway, and includes: a message acquisition module, a signature module, a message comparison module, a first determination module, and a second determination module.

The message acquisition module is configured to obtain a current broadcast message broadcast by a piece of terminal equipment, where the current broadcast message includes current broadcast data.

The signature module is configured to perform a signature processing on the current broadcast data to determine signature information corresponding to the current broadcast data.

The message comparison module is configured to compare the signature information corresponding to the current broadcast message with signature information corresponding to various valid broadcast messages received by the gateway to determine whether a first valid broadcast message that is the same as the current broadcast message is presented in the various valid broadcast messages.

The first determination module is configured to determine, when the first valid broadcast message is presented, that the current broadcast message is a duplicate broadcast message and discard the current broadcast message.

The second determination module is configured to determine, when the first valid broadcast message does that the current broadcast message is a newly-received valid broadcast message.

In accordance with a third aspect of the embodiments of the present application, a piece of terminal equipment is provided, which includes: a memory, a processor, and a computer program stored in the memory and executable by the processor. The processor is configured to, when executing the computer program, implement the method for filtering broadcast data of the first aspect.

In accordance with a fourth aspect of the embodiments of the present application, a computer-readable storage medium is provided. The computer-readable storage medium stores a computer program. The computer program, when executed by a processor, enables the method for filtering broadcast data of the first aspect to be implemented.

In accordance with a fifth aspect of the embodiments of the present application, a computer program product is provided. The computer program product, when running on a piece of terminal equipment, causes the terminal equipment to perform the method for filtering broadcast data of the first aspect.

The present application discloses a method and a device for filtering broadcast data, a piece of terminal equipment and a storage medium. Compared with the existing technology, the embodiments of the present application has at least the following beneficial effects: the method is applied to the gateway, which first obtains the current broadcast message broadcast by the terminal equipment, then performs a signature processing on the current broadcast data in the current broadcast message to determine signature information, and further compares the signature information corresponding to the current broadcast message with the signature information corresponding to the various valid broadcast messages received by the gateway to determine whether the first valid broadcast message that is the same as the current broadcast message is presented in the various valid broadcast messages. If the first valid broadcast message is presented, then the current broadcast message is determined to be the duplicate broadcast message and the current broadcast message is discarded. If the first valid broadcast message is not presented, then the current broadcast message is determined to be the newly-received valid broadcast message. Whereby, the duplicate broadcast message is filtered out by comparing the current broadcast message with the received valid broadcast messages, and only the broadcast messages that is not received before is sent to the server, thereby a duplicate processing of the same broadcast message by the server is avoided, which reduces the operating burden of the server and improves the processing efficiency of the server. Compared with a direct comparison of broadcast data, the broadcast message is compared by comparing signature information, which improves the comparison efficiency of broadcast message.

BRIEF DESCRIPTION OF DRAWINGS

In order to illustrate technical solutions in the embodiments of the present application more clearly, the drawings needed to be used in the description of embodiments will be briefly introduced below. Obviously, the drawings in the following description are merely some embodiments of the present application. For persons of ordinary skill in the art, other drawings may also be obtained based on these drawings without exerting creative efforts.

FIG. 3 is a schematic diagram of a data storage unit according to an embodiment of the present application;

FIG. 4 is a schematic diagram of a broadcast message format according to an embodiment of the present application;

DETAILED DESCRIPTION OF EMBODIMENTS

Figure 1:
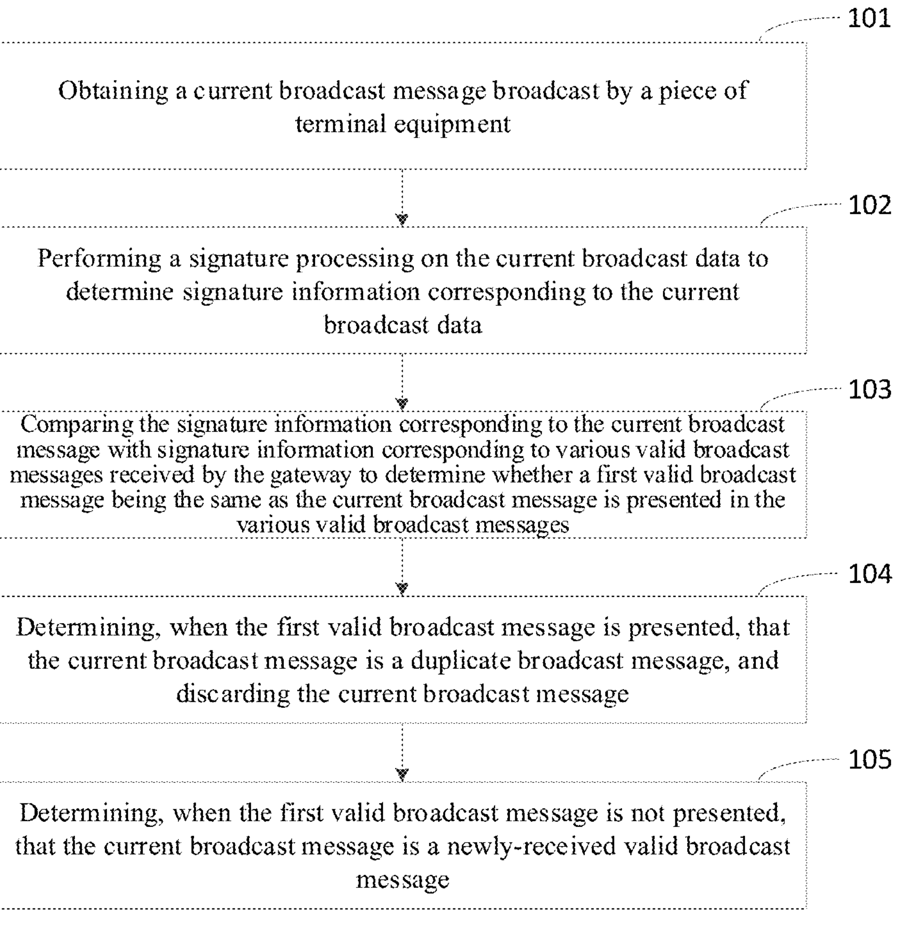
FIG. 1 is a schematic flow chart of a method for filtering broadcast data according to an embodiment of the present application.

In the following description, for the purpose of illustration rather than limitation, specific details such as specific system structures and technologies are presented to facilitate a thorough understanding of the embodiments of the present application. It will be apparent, however, to persons skilled in the art that the present application may be practiced in other embodiments without these specific details. In other instances, detailed descriptions of well-known systems, devices, circuits, and methods are omitted so as not to obscure the description of the present application with unnecessary detail.

It will be understood that, when used in this specification and the appended claims, the term "comprising" indicates a presence of the described features, integers, steps, operations, elements and/or components but does not exclude the presence or addition of one or more of other features, integers, steps, operations, elements, components and/or a combination thereof.

It will also be understood that the term "and/or" as used in this specification and the appended claims refers to and includes any or all possible combinations of one or more of the associated listed items.

As used in this specification and the appended claims, the term "if" may be interpreted, depending on the context, as "when" or "once" or "in response to determining" or "in response to detecting". Similarly, the phrase "if determined" or "if [the described condition or event] is detected" may be interpreted, depending on the context, to mean "once determined" or "in response to a determination" or "once the [described condition or event] is detected" or "in response to a detection of [the described condition or event]".

In addition, in the description of this specification and the appended claims, the terms "first", "second", "third", etc. are only used to distinguish the description, and should not be understood as indicating or implying relative importance.

As described in this specification, references to "one embodiment" or "some embodiments" or the like indicate that a particular feature, structure or characteristic described in connection with the embodiment is included in one or more embodiments of the present application. Whereby, the phrases "in one embodiment", "in some embodiments", "in other embodiments", "in some further embodiments", etc. appearing in different places in this specification are not necessarily referred to the same embodiment, but rather to "one or more but not all embodiments" unless specifically stated otherwise. The terms "including," "comprising," "having," and variations thereof all mean "including but not limited to," unless otherwise specifically emphasized.

It should be understood that the sequence number of each step in this embodiment does not mean an order of execution. The execution order of each process should be determined by its function and internal logic, and should not constitute any limitation on the implementation process of the embodiments of the present application.

In related technologies, after the data broadcast by the Bluetooth device is scanned by the gateway, the broadcast data needs to be reported to the gateway, and then reported by the gateway to the server. However, the Bluetooth device may send duplicate broadcast data within a certain period of time. If all the scanned broadcast data are indiscriminately sent to the server, it will cause the server to process a large amount of duplicate broadcast data multiple times, which then will increase the server's operating burden and reduce the server's processing efficiency.

In view of this, embodiments of the present application provide a method and a device for filtering broadcast data, a piece of terminal equipment and a storage medium, through a comparison of the current broadcast message with the received valid broadcast messages, the duplicate broadcast message is filtered out, and only the broadcast message that is not received before is sent to the server, thereby the server is prevented from repeatedly processing the same broadcast message, the server's operating burden is reduced, and the server's processing efficiency is improved. Compared with a direct comparison of broadcast data, the comparison of broadcast message in the form of signature information has improved a comparison efficiency of broadcast message.

To illustrate the technical solutions of the present application, specific embodiments are provided below.

Referring to FIG. 1, a schematic flow chart of a method for filtering broadcast data provided in an embodiment of the present application is shown. As shown in FIG. 1, the method for filtering broadcast data may include the following steps 101, 102, 103, 104 and 105.

In step 101, a current broadcast message broadcast by a piece of terminal equipment is obtained.

Where, the current broadcast message includes current broadcast data.

In this embodiment of the present application, the terminal equipment may be a Bluetooth device, and any broadcast message may include current broadcast data, a descriptor, etc. The descriptor may include a broadcast type, a connection flag, a received signal strength indication value (Received Signal Strength Indicator, RSSI), a broadcast data length, etc. Among them, the received signal strength indication value is used to evaluate a strength of a wireless signal.

In step 102, a signature processing is performed on the current broadcast data to determine signature information corresponding to the current broadcast data.

In this embodiment of the present application, the current broadcast data may be signed through a signature verification algorithm to obtain the signature information, so that different broadcast data can obtain different signature information through the signature verification algorithm, and then the signature information can effectively represent the corresponding broadcast data.

As a possible implementation, the current broadcast data may be signed using the CRC8 algorithm, and an XOR may be performed on the current broadcast data with a polynomial cyclically. This can ensure that once the current broadcast data changes, the obtained signature information will also change accordingly. For example, the polynomial in the CRC8 algorithm is set to x^8+x^2+x+1, the corresponding generated signature information is 0xF9 when the current broadcast data is 0x11223344, and the corresponding generated signature information is 0xFE when the current broadcast data is 0x11223345.

In step 103, signature information corresponding to the current broadcast message is compared with signature information corresponding to various valid broadcast messages received by a gateway to determine whether a first valid broadcast message being the same as the current broadcast message is presented in the various valid broadcast messages.

Among them, the valid broadcast message refers to a broadcast message that has already presented in a cache of the gateway and needs to be reported to the server. The broadcast data of the first valid broadcast message is the same as the broadcast data of the current broadcast message.

It should be understood that since the time for comparing signature information is less than the time for directly comparing the current broadcast data. To improve the comparison efficiency of the current broadcast message, the signature information of the current broadcast message is compared with the signature information of each valid broadcast message, thereby determining whether the first valid broadcast message is presented in the valid broadcast messages.

In step 104, the current broadcast message is determined as a duplicate broadcast message when the first valid broadcast message is presented, and the current broadcast message is discarded.

In this embodiment of the present application, when the first valid broadcast message is presented, it is indicated that a broadcast message being the same as the current broadcast message has already presented in the cache of the gateway in this case. At this time, the current broadcast message is discarded to avoid the broadcast message being repeatedly sent within a certain period of time to reduce the burden of processing broadcast data on the server.

In step 105, the current broadcast message is determined as a newly-received valid broadcast message when the first valid broadcast message is not presented.

In this embodiment of the present application, when first valid broadcast message is not presented, it is indicated that no broadcast message being the same as the current broadcast message is presented in the cache of the gateway in this case. At this time, the current broadcast message is determined as a new valid broadcast message and stored into the cache of the gateway.

The method for filtering broadcast data disclosed in the above embodiments of the present application is applied to the gateway. In this method, the current broadcast message broadcast by the terminal equipment is obtained first; then, a signature processing is performed on the current broadcast data in the current broadcast message to determine the signature information; and further, the signature information corresponding to the current broadcast message is compared with the signature information corresponding to various valid broadcast messages received by the gateway to determine whether the first valid broadcast message being the same as the current broadcast message is presented in the various valid broadcast messages. If the first valid broadcast message is presented, then it is determined the current broadcast message is a duplicate broadcast message, and the current broadcast message will be discarded. If the first valid broadcast message is not presented, then the current broadcast message will be determined as a newly-received valid broadcast message. Whereby, the duplicate broadcast message is filtered out by comparing the current broadcast message with the received valid broadcast messages, and only the broadcast message that is not received before is sent to the server, so that the server is prevented from repeatedly processing the same broadcast message, which reduces the operating burden of the server and improves the processing efficiency of the server. Compared with the direct comparison of broadcast data, the comparison of the broadcast message based on signature information has improved the comparison efficiency of broadcast message.

In a possible implementation of the present application, the current broadcast message also includes a MAC address corresponding to the current broadcast message. The MAC address is the MAC address of the terminal equipment. The gateway's cache contains a data storage unit corresponding to the MAC address of each valid broadcast message. Among them, the gateway's cache includes multiple data storage units, and each data storage unit stores broadcast message of fixed terminal equipment. Each terminal equipment corresponds to a MAC address (Media Access Control Address). The MAC address is also called a physical address which is a unique identity of the terminal equipment. By directly determining whether the first valid broadcast message is presented in the gateway's cache in the data storage unit that matches the MAC address corresponding to the current broadcast message, the comparison efficiency of broadcast message can be further improved.

Figure 2:
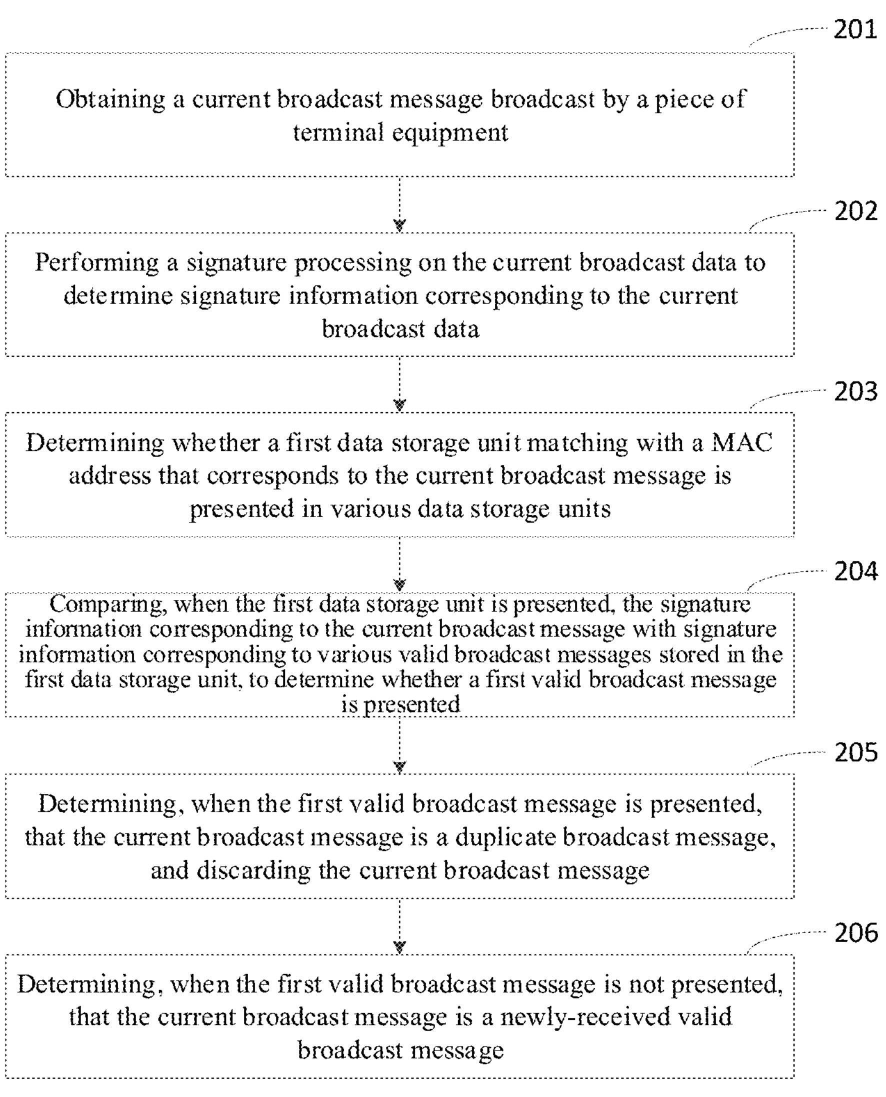
FIG. 2 is a schematic flow chart of a method for filtering broadcast data according to another embodiment of the present application.

Referring to FIG. 2, a schematic flow chart of a method for filtering broadcast data provided in anther embodiment of the present application is shown. As shown in FIG. 2, the method for filtering broadcast data may include the following steps 201, 202, 203, 204, 205 and 206.

In step 201, a current broadcast message broadcast by a piece of terminal equipment is obtained.

Where, the current broadcast message includes current broadcast data.

In step 202, a signature processing is performed on the current broadcast data to determine signature information corresponding to the current broadcast data.

For the specific implementation process and principles of the above steps 201-202, references may be made to the detailed description of the above embodiments and will not be described again here.

In step 203, it is determined whether a first data storage unit matching with a MAC address that corresponds to the current broadcast message is presented in various data storage units.

Where, any data storage unit corresponds to a unique MAC address, and it can be determined based on the MAC address whether the first data storage unit matching the MAC address that corresponds to the current broadcast message is presented in the various data storage units.

In step 204, the signature information corresponding to the current broadcast message is compared with the signature information corresponding to various valid broadcast messages stored in the first data storage unit when the first data storage unit is presented, to determine whether a first valid broadcast message is presented.

Where, when the first data storage unit is presented, it is indicated that the valid broadcast message of the terminal equipment corresponding to the current broadcast message has already presented in the cache of the gateway, so that whether the first valid broadcast message is presented can be directly determined in the first data storage unit.

As a possible implementation of the present application, in order to facilitate subsequent matching of new broadcast messages, when the first data storage unit is not presented in the various data storage units, a new data storage unit corresponding to the MAC address that corresponds to the current broadcast message may be created, and the current broadcast message as a newly-received valid broadcast message is stored into the newly-created data storage unit.

Further, the first data storage unit may preset a quantity threshold of valid broadcast messages. The quantity threshold may be configured according to the actual application scenarios, which will not be limited in this application. The quantity of valid broadcast messages of the first data storage unit within a certain period of time may reach the quantity threshold. At this time, a second valid broadcast message needs to be sent directly to the server, where the second valid broadcast message refers to the earliest valid broadcast message of the first scan time in the first data storage unit. That is, in a possible implementation of the present application, the above-mentioned storing of the current broadcast message as the newly-received valid broadcast message in the newly-created data storage unit may include steps of: determining whether the quantity of valid broadcast messages in the first data storage unit is equal to the quantity threshold; sending, when the quantity of valid broadcast messages is equal to the quantity threshold, a corresponding second valid broadcast message having the earliest valid broadcast message of the first scan time in the first data storage unit to the server, and deleting the second valid broadcast message; storing the current broadcast message in the first data storage unit; storing, when the quantity of valid broadcast messages is less than the quantity threshold, the current broadcast message in the first data storage unit, and adding 1 to the quantity of valid broadcast messages.

Referring to FIG. 3, which is a schematic diagram of a possible data storage unit. It should be understood that the broadcast message in FIG. 3 is an example, only six are shown, and the quantity threshold is not limited in here.

Further, the current broadcast message also includes current scan time, and the valid broadcast message has corresponding first scan time and latest scan time, where the first scan time refers to the time the valid broadcast message is stored in the data storage unit for the first time, the latest scan time refers to the time when the same valid broadcast message was last scanned. When reporting the valid broadcast message to the server, the latest scan time needs to be reported at the same time. When the first valid broadcast message is presented in the first data storage unit, the latest scan time corresponding to the first valid broadcast message needs to be updated. When the first valid broadcast message is not presented in the first data storage unit, the current scan time needs to be used as the first scan time and the latest scan time. That is, in a possible implementation of the embodiments of the present application, after step 204, the method may also include steps of: updating, when the first valid broadcast message is presented, the latest scan time corresponding to the first valid broadcast message to the current scan time; storing, when the first valid broadcast message is not presented, the current scan time, taken as the first scan time and the latest scan time corresponding to the current broadcast message, in the first data storage unit.

Referring to FIG. 4, which is a schematic diagram of a possible broadcast message format.

In step 205, the current broadcast message is determined as a duplicate broadcast message when the first valid broadcast message is presented, and the current broadcast message is discarded.

In step 206, the current broadcast message is determined as a newly-received valid broadcast message when the first valid broadcast message is not presented.

For the specific implementation process and principles of the above steps 205-206, references may be made to the detailed description of the above embodiments and will not be described again here.

Further, when the first valid broadcast message is not presented in the first data storage unit, it is indicated that no duplicate message is presented in the first data storage unit in the cache. At this time, the current broadcast message may be stored in the first data storage unit, that is, in a possible implementation of this embodiment of the present application, after step 206, the method also includes a step of: storing the current broadcast message as the newly-received valid broadcast data in the first data storage unit.

Furthermore, the embodiments of the present application can filter out duplicate broadcast data within a certain period of time. However, if the current time in the cache has exceeded a preset filtering period from the first scan time of a third valid broadcast message, then the third valid broadcast message needs to be sent to the server, where the third valid broadcast message refers to a valid broadcast message in which the time interval between the first scan time and the current moment is greater than or equal to the preset filtering period. That is, in a possible implementation of this embodiment of the present application, the method for filtering broadcast data also includes steps of: determining a time interval between the first scan time corresponding to each valid broadcast message and the current moment; sending the third valid broadcast message to the server, when time interval between the first scan time and the current moment is greater than or equal to the preset filtering period; and deleting the third valid broadcast message from a data storage unit where the third valid broadcast message is stored, and subtracting a quantity of the third valid broadcast message from the quantity of valid broadcast messages corresponding to the data storage unit where the third valid broadcast message is stored.

Among them, the preset filtering period may be set according to the actual application scenarios, for example, the preset filtering period may be set to check once every second.

In the method for filtering broadcast data disclosed in the above embodiments of the present application, the current broadcast message including the current broadcast data is obtained first, then, the signature processing is performed on the current broadcast data to determine the signature information, and then, it is determined whether the first data storage unit matching with the MAC address that corresponds to the current broadcast message is presented in the various data storage units, and the signature information corresponding to the current broadcast message is compared with the signature information corresponding to each valid broadcast message stored in the first data storage unit when the first data storage unit is presented, to determine whether the first valid broadcast message is presented, and finally, the current broadcast message is discard when it is duplicated, and the current broadcast message is retained when it is not duplicated. Thereby, the first data storage unit that matches the MAC address corresponding to the current broadcast message is first found through the MAC address, and then it is directly determined in the first data storage unit whether the current broadcast message is the duplicate broadcast message, which further improves the comparison efficiency of broadcast message.

In a possible implementation of the present application, before comparing the signature information of the current broadcast data, the current broadcast message may be pre-filtered, which can further improve the comparison efficiency of the broadcast message.

Figure 5:
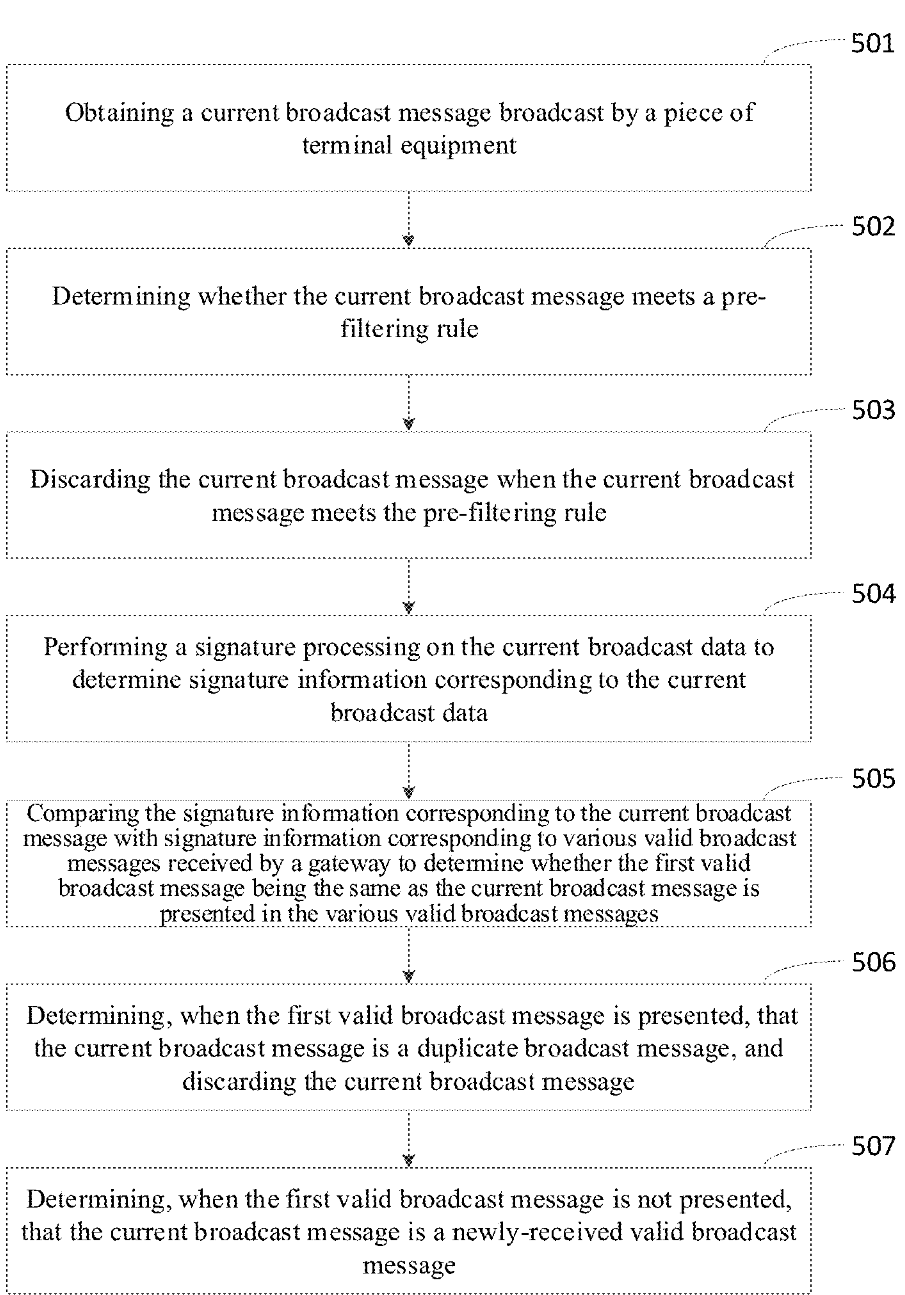
FIG. 5 is a schematic flow chart of a method for filtering broadcast data according to a further embodiment of the present application.

Referring to FIG. 5, a schematic flow chart of a method for filtering broadcast data provided in a further embodiment of the present application is shown. As shown in FIG. 5, the method for filtering broadcast data may include the following steps 501, 502, 503, 504, 505, 506 and 507.

In step 501, a current broadcast message broadcast by a piece of terminal equipment is obtained.

Where, the current broadcast message includes current broadcast data.

For the specific implementation process and principle of the above step 501, references may be made to the detailed description of the above embodiments and will not be described again here.

In step 502, it is determined whether the current broadcast message meets a pre-filtering rule.

Further, the current broadcast message may be pre-filtered by filtering the broadcast message broadcast by the terminal equipment corresponding to a specific MAC address. That is, in a possible implementation of this embodiment of the present application, the current broadcast message also includes a MAC address corresponding to the current broadcast message. The corresponding MAC address is the MAC address of the terminal equipment. The pre-filtering rule includes a preset address range. The above step 502 may include steps of: determining that the current broadcast message meets the pre-filtering rule in case that the MAC address corresponding to the current broadcast message is within the preset address range; and determining that the current broadcast message does not meet the pre-filtering rule in case that the MAC address corresponding to the current broadcast message is within the preset address range.

Among them, the preset address range may be set according to the actual application scenarios, and will not be limited in this application.

For example, the filtering of MAC addresses may either be to filter MAC addresses within a certain range, such as filtering the terminal equipment whose first three bytes of the MAC address are AC:23:3F, or may be to filter several specific MAC addresses, such as filtering equipment whose MAC address is AC:23:3F:10:00:00 or AC:23:3F:20:01:00.

Furthermore, the pre-filtering for the current broadcast message may be achieved by filtering a broadcast message whose received signal strength indication value is not within a preset range of received signal strength indication values. That is, in a possible implementation of this embodiment of the present application, The current broadcast message also includes a descriptor corresponding to the current broadcast message, and the descriptor includes a received signal strength indication value. The above step 502 may include steps of: determining that the current broadcast message meets the pre-filtering rule in case that the received signal strength indication value corresponding to the current broadcast message is within the preset range of received signal strength indication values; and determining that the current broadcast message does not meet the pre-filtering rule in case that the received signal strength indication value corresponding to the current broadcast message is not within the preset range of received signal strength indication values.

Among them, the preset range of received signal strength indication values may be set according to the actual application scenarios, which will not be limited in this application.

For example, the range of received signal strength indication values is −70 dBm~−10 dBm, then the current broadcast message having the received signal strength indication value between −70 dBm~−10 dBm meets the pre-filtering rule.

Furthermore, since the broadcast data generally includes manufacturer-defined data or customized service data, the broadcast message of a specific broadcast type may be filtered to achieve the pre-filtering of the current broadcast message. That is, in a possible implementation of this embodiment of the present application, the descriptor also includes a broadcast type, and the above step 502 may include steps of: determining that the current broadcast message meets the pre-filtering rule in case that the broadcast type corresponding to the current broadcast message belongs to a preset broadcast type; and determining that the current broadcast message does not meet the pre-filtering rule in case that the broadcast type corresponding to the current broadcast message does not belong to the preset broadcast type.

Among them, the preset broadcast type may be set according to the actual application scenarios, which will not be limited in this application.

For example, if a broadcast message which has a broadcast type of 0xFF and a manufacturer ID of 0x4C00 need to be filtered, the first step is to determine whether the data having a broadcast type of 0xFF is presented in the current broadcast message format. If the data having a broadcast type of 0xFF is not presented, then the current broadcast message does not meet the conditions. If the data having a broadcast type of 0xFF is presented, then it is determined whether the first two bytes of the manufacturer ID in the current broadcast data are 0x4C00. If it is determined that the first two bytes of the manufacturer ID in the current broadcast data are 0x4C00, then the current broadcast message meets the pre-filtering rule. For example, if the current broadcast message whose broadcast type is 0x16 and the service UUID (Universally Unique Identifier) is 0x1122 needs to be filtered, the first step is to determine whether the data having a broadcast type of 0x16 is presented in the current broadcast message format. If the data having a broadcast type of 0x16 is not presented, then the current broadcast message does not meet the conditions. If the data having a broadcast type of 0x16 is presented, then it is determined whether the first two bytes of the service UUID in the current broadcast data are 0x1122. If it is determined that the first two bytes of the service UUID in the current broadcast data are 0x1122, then the current broadcast message meets the pre-filtering rule. This can be more accurate and faster than the method of directly determining the presence of 0xFF4C00 and 0x161122 in the current broadcast data.

In step 503, the current broadcast message is discarded when the current broadcast message meets the pre-filtering rule.

In step 504, a signature processing is performed on the current broadcast data to determine signature information corresponding to the current broadcast data when the current broadcast message does not meet the pre-filtering rule.

In step 505, the signature information corresponding to the current broadcast message is compared with the signature information corresponding to various valid broadcast messages received by a gateway to determine whether the first valid broadcast message being the same as the current broadcast message is presented in the various valid broadcast messages.

In step 506, the current broadcast message is determined as a duplicate broadcast message when the first valid broadcast message is presented, and the current broadcast message is discarded.

In step 507, the current broadcast message is determined as a newly-received valid broadcast message when the first valid broadcast message is not presented.

For the specific implementation process and principles of the above steps 504-507, references may be made to the detailed description of the above embodiments and will not be described again here.

In the method for filtering broadcast data disclosed in the above embodiments of the present application, the current broadcast message including the current broadcast data is obtained first, then, it is determined whether the current broadcast message meets the pre-filtering rule, and the current broadcast message is discarded when the current broadcast message meets the pre-filtering rule, and then, a comparison of the signature information corresponding to the current broadcast message is performed, and finally, the current broadcast message is discarded when it is duplicated, and the current broadcast message is retained when it is not duplicated. Therefore, by setting a pre-filtering rule according to actual usage requirements, unnecessary broadcast message is first filtered out according to the pre-filtering rule before filtering the duplicate broadcast message, so that duplicate broadcast message comparisons for unnecessary broadcast messages can be avoided, this not only further improves the efficiency of broadcast data filtering, but also flexibly filters out unnecessary broadcast data according to actual needs, improves the flexibility and practicality of broadcast data filtering, which then further reduces the operating burden of the server, and improves the processing efficiency of the server.

Figures 6, 7:
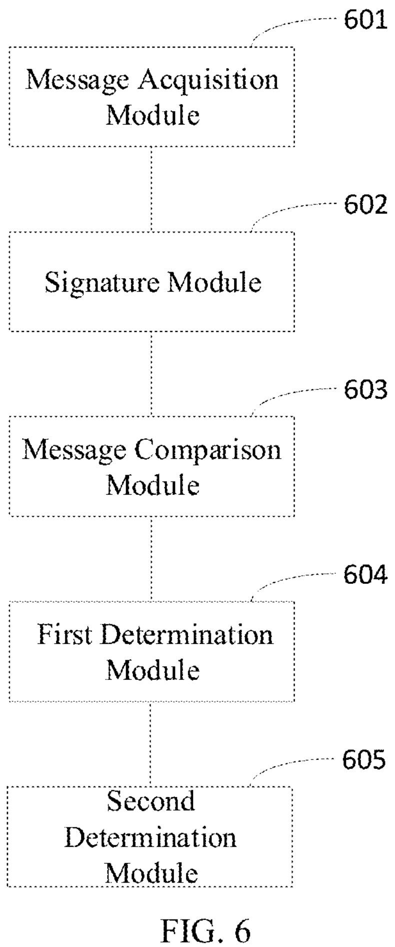
FIG. 6 is a schematic structural diagram of a device for filtering broadcast data according to an embodiment of the present application.
FIG. 7 is a schematic structural diagram of a piece of terminal equipment according to an embodiment of the present application.

Referring to FIG. 6, a schematic structural diagram of a device for filtering broadcast data provided in an embodiment of the present application is shown. For convenience of explanation, only the parts related to the embodiment of the present application are shown.

The device for filtering broadcast data may be applied to a gateway, may particularly include: a message acquisition module 601, a signature module 602, a message comparison module 603, a first determination module 604 and a second determination module 605.

The message acquisition module 601 is configured to obtain a current broadcast message broadcast by a piece of terminal equipment, where the current broadcast message includes current broadcast data.

The signature module 602 is configured to perform a signature processing on the current broadcast data to determine signature information corresponding to the current broadcast data.

The message comparison module 603 is configured to compare the signature information corresponding to the current broadcast message with signature information corresponding to various valid broadcast messages received by the gateway to determine whether a first valid broadcast message being the same as the current broadcast message is presented in the various valid broadcast messages.

The first determination module 604 is configured to determine that the current broadcast message is a duplicate broadcast message when the first valid broadcast message is presented and discard the current broadcast message.

The second determination module 605 is configured to determine that the current broadcast message is a newly-received valid broadcast message when the first valid broadcast message is not presented.

The device for filtering broadcast data disclosed in the above embodiment of the present application is applied to the gateway. The current broadcast message broadcast by the terminal equipment is obtained first, and then the signature processing is performed on the current broadcast data in the current broadcast message to determine the signature information, and further, the signature information corresponding to the current broadcast message is compared with the signature information corresponding to each valid broadcast message received by the gateway to determine whether the first valid broadcast message that is the same as the current broadcast message is presented in the various valid broadcast messages. If the first valid broadcast message is presented, then the current broadcast message is determined as the duplicated broadcast message and is discarded. If the first valid broadcast message is not presented, then the current broadcast message is determined as the newly-received valid broadcast message. Whereby, the duplicate broadcast message is filtered out by comparing the current broadcast message with the received valid broadcast messages, and only the broadcast message that is not received before is sent to the server, thereby the server is prevented from repeatedly processing the same broadcast message, which reduces the operating burden of the server and improves the processing efficiency of the server. Compared with the direct comparison of broadcast data, the comparison of the broadcast message based on the signature information has improved the comparison efficiency of broadcast message.

In a possible implementation of this embodiment of the present application, the current broadcast message also includes a MAC address corresponding to the current broadcast message. The MAC address is a MAC address of the terminal equipment, and a cache of the gateway contains data storage unit corresponding to the MAC address of each valid broadcast message. The message comparison module 603 may particularly include a first determination sub-module and a first comparison sub-module.

The first determination sub-module is configured to determine whether a first data storage unit matching with the MAC address that corresponds to the current broadcast message is presented in various data storage units.

The first comparison sub-module is configured to compare, when the first data storage unit is presented, the signature information corresponding to the current broadcast message with the signature information corresponding to the various valid broadcast messages stored in the first data storage unit to determine whether the first valid broadcast message is presented.

In a possible implementation of this embodiment of the present application, the message comparison module 603, after being configured to determine whether the first data storage unit matching with the MAC address that corresponds to the current broadcast message is presented in the various data storage units, may particularly include a first creation sub-module and a first storage sub-module.

The first creation sub-module is configured to create a new data storage unit corresponding to the MAC address that corresponds to the current broadcast message when the first data storage unit is not presented.

The first storage sub-module is configured to store the current broadcast message as a newly-received valid broadcast message in the newly-created data storage unit.

In a possible implementation of this embodiment of the present application, the message comparison module 603, after being configured to determine the current broadcast message as the newly-received valid broadcast message when the first valid broadcast message is not presented, may particularly include a second storage sub-module.

The second storage sub-module is configured to store the current broadcast message as the newly-received valid broadcast data in the first data storage unit.

In a possible implementation of this embodiment of the present application, the current broadcast message also includes current scan time, and the valid broadcast message has corresponding first scan time and latest scan time. The message comparison module 603, after being configured to compare, when the first data storage unit is presented, the signature information corresponding to the current broadcast message with the signature information corresponding to the various valid broadcast messages stored in the first data storage unit to determine whether the first valid broadcast message is presented, may particularly include a first update sub-module and a second update sub-module.

The first update sub-module is configured to update the latest scan time corresponding to the first valid broadcast message to the current scan time when the first valid broadcast message is presented.

The second update sub-module is configured to store, when the first valid broadcast message is not presented, the current scan time taken as the first scan time and the latest scan time corresponding to the current broadcast message, in the first data storage unit.

In a possible implementation of this embodiment of the present application, the second storage sub-module may particularly include: a determination unit, a sending unit, a first storage unit and a second storage unit.

The determination unit is configured to determine whether a quantity of valid broadcast messages in the first data storage unit is equal to a quantity threshold.

The sending unit is configured to send, when the quantity of valid broadcast message is equal to the quantity threshold, a corresponding second valid broadcast message having the earliest valid broadcast message of the first scan time in the first data storage unit to the server, and delete the second valid broadcast message.

The first storage unit is configured to store the current broadcast message into the first data storage unit.

The second storage unit is configured to store, when the quantity of valid broadcast messages is less than the quantity threshold, the current broadcast message in the first data storage unit, and add 1 to the quantity of valid broadcast messages.

In a possible implementation of this embodiment of the present application, the device for filtering broadcast data may also include a third determination module, a sending module and a deletion module.

The third determination module is configured to determine a time interval between the first scan time corresponding to each valid broadcast message and a current moment.

The sending module is configured to send a third valid broadcast message, whose time interval between the first scan time and the current moment is greater than or equal to a preset filtering period, to the server.

The deletion module configured to delete the third valid broadcast message from the data storage unit where the third valid broadcast message is stored, and subtract a quantity of third valid broadcast messages from the quantity of valid broadcast messages corresponding to the data storage unit where the third valid broadcast message is stored.

In a possible implementation of this embodiment of the present application, the device for filtering broadcast data, before being configured to perform the signature processing on the current broadcast data to determine the signature information corresponding to the current broadcast data, may also include a determination module, and a discard module.

The determination module is configured to determine whether the current broadcast message meets a pre-filtering rule.

The discard module is configured to discard the current broadcast message when the current broadcast message meets the pre-filtering rule.

In a possible implementation of this embodiment of the present application, the current broadcast message also includes a MAC address corresponding to the current broadcast message. The above MAC address is a MAC address of the terminal equipment, and the pre-filtering rule includes a preset address range. The determination module can particularly include a first determination sub-module.

The first determination sub-module is configured to determine that the current broadcast message meets the pre-filtering rule in case that the MAC address corresponding to the current broadcast message is within the preset address range; and determine that the current broadcast message does not meet the pre-filtering rule in case that the MAC address corresponding to the current broadcast message is not within the preset address range.

In a possible implementation of this embodiment of the present application, the current broadcast message also includes a descriptor corresponding to the current broadcast message, the descriptor includes a received signal strength indication value, and the pre-filtering rule include a preset range of the received signal strength indication value. The determination module may particularly include a second determination sub-module.

The second determination sub-module is configured to determine that the current broadcast message meets the pre-filtering rule in case that the received signal strength indication value corresponding to the current broadcast message is within the preset range of the received signal strength indication value; and determine that the current broadcast message does not meet the pre-filtering rule in case that the received signal strength indication value corresponding to the current broadcast message is not within the preset range of the received signal strength indication value.

In a possible implementation of this embodiment of the present application, the descriptor also includes a broadcast type, and the pre-filtering rule includes a preset broadcast type. The determination module may particularly include a third determination sub-module.

The third determination sub-module is configured to determine that the current broadcast message meets the pre-filtering rule in case that the broadcast type corresponding to the current broadcast message belongs to a preset broadcast type; and determine that the current broadcast message does not meet the pre-filtering rule in case that the broadcast type corresponding to the current broadcast message does not belong to the preset broadcast type.

In the device for filtering broadcast data disclosed in the above embodiments of the present application, the current broadcast message including the current broadcast data is obtained first, then it is determined whether the current broadcast message meets the pre-filtering rule, and discards the current broadcast message when the current broadcast message meets the pre-filtering rule, then, a comparison of the signature information corresponding to the current broadcast message is performed, and finally, the current broadcast message is discarded when it is duplicated and is retained when it is not duplicated. Therefore, by setting pre-filtering rule according to actual usage requirements, unnecessary broadcast message is first filtered out according to the pre-filtering rule before filtering duplicate broadcast message, so that duplicate broadcast message comparisons for unnecessary broadcast message can be avoided, this not only further improves the efficiency of broadcast data filtering, but also flexibly filters out unnecessary broadcast data according to actual needs, improves the flexibility and practicality of broadcast data filtering, which then further reduces the operating burden of the server, and improves the processing efficiency of the server.

The device for filtering broadcast data provided by the embodiments of the present application may be applied in the foregoing method embodiments. For more details, reference may be made to the description of the foregoing method embodiments, which will not be described again here.

FIG. 7 is a schematic structural diagram of a piece of terminal equipment provided in an embodiment of the present application. As shown in FIG. 7, the terminal equipment 700 of this embodiment includes: at least one processor 710 (only one is shown in FIG. 7), a memory 720, and a computer program 721 stored in the memory 720 and executable by the at least one processor 710. The processor 71, when executing the computer program 721, enables the steps in the above embodiment of the method for filtering broadcast data to be implemented.

The terminal equipment 700 may be a computing device such as a desktop computer, a notebook, a handheld computer, a cloud server, etc. The terminal equipment may include, but is not limited to, a processor 710 and a memory 720. Persons skilled in the art can understand that FIG. 7 is only an example of the terminal equipment 700 and does not constitute a limitation on the terminal equipment 700. More or fewer components may be included than shown in the figure, or some components may be combined, or different components may be used, for example, the terminal equipment may also include input and output devices, network access devices, etc.

The so-called processor 710 may be a central processing unit (CPU). The processor 710 may also be other general-purpose processors, a digital signal processor (DSP), an application specific integrated circuits (ASIC), a field-programmable gate array (FPGA) or other programmable logic devices, discrete gate or transistor logic devices, discrete hardware components, etc. A general-purpose processor may be a microprocessor or the processor may be any conventional processor, etc.

The memory 720 may be an internal storage unit of the terminal equipment 700 in some embodiments, such as a hard disk or a memory of the terminal equipment 700. In other embodiments, the memory 720 may also be an external storage device of the terminal equipment 700, such as a plug-in hard disk, a smart media card (SMC), or a secure digital (SD) card, a flash card, etc., equipped on the terminal equipment 700. Further, the memory 720 may also include both an internal storage unit of the terminal equipment 700 and an external storage device. The memory 720 is configured to store operating systems, application programs, boot loaders, data and other programs, such as program codes of the computer programs. The memory 720 may also be configured to temporarily store data that has been output or is to be output.

It can be clearly understood for persons skilled in the art that, for the convenience and simplicity of description, only the division of the above functional units and modules is used as an example. In actual applications, the above functions may be allocated to different functional units and modules according to actual needs. That is, the internal structure of the device is divided into different functional units or modules to complete all or part of the functions described above. Each functional unit and module in the embodiment may be integrated into one processing unit, or each unit may exist physically alone, or two or more units may be integrated into one unit. The above-mentioned integrated unit may be implemented in the form of hardware, or may also be implemented in the form of software functional units. In addition, the specific names of each functional unit and module are only for the convenience of distinguishing each other and are not used to limit the scope of protection of the present application. For the specific working processes of the units and modules in the above system, references may be made to the corresponding processes in the foregoing method embodiments, which will not be described again here.

In the above embodiments, each embodiment is described with its own emphasis. For parts that are not detailed or documented in a certain embodiment, references may be made to the relevant descriptions of other embodiments.

It will be appreciated by those of ordinary skill in the art that the units and algorithm steps of each example described in conjunction with the embodiments disclosed herein may be implemented with electronic hardware, or a combination of computer software and electronic hardware. Whether these functions are performed in hardware or software depends on the specific application and design constraints of the technical solution. Skilled artisans may implement the described functionality using different methods for each specific application, but such implementations should not be considered beyond the scope of this application.

In the embodiments provided in this application, it should be understood that the disclosed devices/terminal equipment and methods may be implemented in other ways. For example, the device/terminal equipment embodiments described above are only illustrative. For example, the division of modules or units is only a logical function division. In actual implementation, there may be other division methods, such as multiple units or components may be combined or may be integrated into another system, or some features may be omitted, or not implemented. In another aspect, the coupling or direct coupling or communication connection between each other shown or discussed may be an indirect coupling or communication connection of devices or units through some interfaces, which may be in electrical, mechanical or other forms.

The units described as separate components may or may not be physically separated, and the components shown as units may or may not be physical units, that is, they may be located in one place, or they may be distributed to multiple network units. Some or all of the units may be selected according to actual needs to achieve the purpose of the solution of this embodiment.

In addition, each functional unit in each embodiment of the present application may be integrated into one processing unit, each unit may exist physically alone, or two or more units may be integrated into one unit. The above integrated units may be implemented in the form of hardware or software functional units.

If the integrated module/units are implemented in the form of software functional units and sold or used as an independent product, these modules/units may be stored in a computer-readable storage medium. Based on this understanding, the present application may implement all or part of the processes in the methods of the above embodiments, which may also be completed by instructing relevant hardware through a computer program. The computer program may be stored in a computer-readable storage medium, and the computer program, when being executed by a processor, causes the steps of each of the above method embodiments to be implemented. Among them, the computer program includes a computer program code, which may be in the form of a source code, an object code, an executable file or some intermediate forms. The computer-readable medium may include: any entity or device capable of carrying the computer program code, a recording medium, a U disk, a mobile hard disk, a magnetic disk, an optical disk, a computer memory, a read-only memory (ROM), a random-access memory (RAM), an electrical carrier signal, a telecommunications signal, and a software distribution medium, etc. It should be noted that the content presented in the computer-readable medium may be appropriately added or deleted according to the requirements of legislation and patent practice in the jurisdiction. For example, in some jurisdictions, according to legislation and patent practice, the computer-readable medium excludes electrical carrier signals and telecommunications signals.

Implementations for all or part of the processes in the methods of the above embodiments in the present application may also be completed through a computer program product. The computer program product, when running on a piece of terminal equipment, enables the terminal equipment to implement the steps of the above method embodiments.

The above-described embodiments are only used to illustrate the technical solution of the present application, and are not intended to limit the present application. Although the present application has been described in detail with reference to the foregoing embodiments, those of ordinary skill in the art should understand that it is still possible to modify the technical solutions recorded in the foregoing embodiments, or make equivalent substitutions for some of the technical features; and these modifications or substitutions do not deviate from the essence of the corresponding technical solutions from the spirit and scope of the technical solutions of the embodiments of this application, and shall all be included within the protection scope of this application.

What is claimed is:

1. A method for filtering broadcast data, applied to a gateway, the method comprising:

obtaining a current broadcast message broadcast by a piece of terminal equipment, wherein the current broadcast message comprises current broadcast data;

performing a signature processing on the current broadcast data to determine signature information corresponding to the current broadcast data;

comparing the signature information corresponding to the current broadcast message with signature information corresponding to various valid broadcast messages received by the gateway to determine whether a first valid broadcast message being the same as the current broadcast message is presented in the various valid broadcast messages;

determining, when the first valid broadcast message is presented, that the current broadcast message is a duplicate broadcast message, and discarding the current broadcast message; and determining, when the first valid broadcast message is not presented, that the current broadcast message is a newly-received valid broadcast message, wherein before said performing the signature processing on the current broadcast data to determine the signature information corresponding to the current broadcast data, the method further comprises:

determining whether the current broadcast message meets a pre-filtering rule; and discarding the current broadcast message when the current broadcast message meets the pre-filtering rule.

2. The method for filtering broadcast data according to claim 1, wherein the current broadcast message further comprises a MAC address corresponding to the current broadcast message, and the MAC address is a MAC address of the terminal equipment, a cache of the gateway comprises various data storage units corresponding to MAC addresses of the various valid broadcast messages, and said comparing the signature information corresponding to the current broadcast message with the signature information corresponding to the various valid broadcast messages received by the gateway to determine whether the first valid broadcast message being the same as the current broadcast message is presented in the various valid broadcast messages, comprises:

determining whether a first data storage unit matching with the MAC address that corresponds to the current broadcast message is presented in the various data storage units;

comparing, when the first data storage unit is presented, the signature information corresponding to the current broadcast message with the signature information corresponding to the various valid broadcast messages stored in the first data storage unit to determine whether the first valid broadcast message is presented.

3. The method for filtering broadcast data according to claim 2, wherein after said determining whether the first data storage unit matching with the MAC address that corresponds to the current broadcast message is presented in the various data storage units, the method further comprises:

newly-creating, when the first data storage unit is not presented, a data storage unit corresponding to the MAC address that corresponds to the current broadcast message;

storing the current broadcast message as the newly-received valid broadcast message in the data storage unit that is newly-created.

4. The method for filtering broadcast data according to claim 2, wherein after said determining, when the first valid broadcast message is not presented, that the current broadcast message is a newly-received valid broadcast message, the method further comprises:

storing the current broadcast message as newly-received valid broadcast data in the first data storage unit.

5. The method for filtering broadcast data according to claim 4, wherein the current broadcast message further comprises current scan time, each of the various valid broadcast messages has corresponding first scan time and latest scan time, after said comparing, when the first data storage unit is presented, the signature information corresponding to the current broadcast message with the signature information corresponding to the various valid broadcast messages stored in the first data storage unit to determine whether the first valid broadcast message is presented, the method further comprises:

updating, when the first valid broadcast message is presented, the latest scan time corresponding to the first valid broadcast message to the current scan time;

storing, when the first valid broadcast message is not presented, the current scan time, taken as the first scan time and the latest scan time corresponding to the current broadcast message, in the first data storage unit.

6. The method for filtering broadcast data according to claim 5, wherein said storing the current broadcast message as the newly-received valid broadcast data in the first data storage unit comprises:

determining whether a quantity of the valid broadcast messages in the first data storage unit is equal to a quantity threshold;

sending, when the quantity of valid broadcast messages is equal to the quantity threshold, a corresponding second valid broadcast message having an earliest valid broadcast message of the first scan time in the first data storage unit to a server, and deleting the corresponding second valid broadcast message from the first data storage unit;

storing the current broadcast message into the first data storage unit; and storing, when the quantity of valid broadcast messages is less than the quantity threshold, the current broadcast message in the first data storage unit, and adding the quantity of valid broadcast messages by 1.

7. The method for filtering broadcast data as claimed in claim 5, further comprising:

determining a time interval between the first scan time corresponding to each valid broadcast message and a current moment;

sending a third valid broadcast message whose time interval between the first scan time and the current moment is greater than or equal to a preset filtering period to a server; and deleting the third valid broadcast message from a data storage unit where the third valid broadcast message is stored, and subtracting a quantity of the third valid broadcast message from the quantity of the valid broadcast messages corresponding to the data storage unit where the third valid broadcast message is stored.

8. The method for filtering broadcast data according to claim 1, wherein the current broadcast message further comprises any one of a MAC address corresponding to the current broadcast message, a received signal strength indication value and a broadcast type, wherein, the MAC address is a MAC address of the terminal equipment;

when the current broadcast message comprises the MAC address corresponding to the current broadcast message, the pre-filtering rule comprises a preset address range, and said determining whether the current broadcast message meets the pre-filtering rule comprises:

determining, in case that the MAC address corresponding to the current broadcast message is within the preset address range, that the current broadcast message meets the pre-filtering rule;

determining, in case that the MAC address corresponding to the current broadcast message is not within the preset address range, that the current broadcast message does not meet the pre-filtering rule, or, when the current broadcast message comprises the received signal strength indication value corresponding to the current broadcast message, the pre-filtering rule comprises a preset range of the received signal strength indication value, and said determining whether the current broadcast message meets the pre-filtering rule comprises:

determining, in case that the received signal strength indication value corresponding to the current broadcast message is within the preset range of the received signal strength indication value, that the current broadcast message meets the pre-filtering rule;

determining, in case that the received signal strength indication value corresponding to the current broadcast message is not within the preset range of the received signal strength indication value, that the current broadcast message does not meet the pre-filtering rule, or, when the current broadcast message comprises the broadcast type corresponding to the current broadcast message, the pre-filtering rule comprises a preset broadcast type, and said determining whether the current broadcast message meets the pre-filtering rule comprises:

determining, in case that the broadcast type corresponding to the current broadcast message belongs to the preset broadcast type, that the current broadcast message meets the pre-filtering rule;

determining, in case that the broadcast type corresponding to the current broadcast message does not belong to the preset broadcast type, that the current broadcast message does not meet the pre-filtering rule.

9. Terminal equipment, comprising a memory, a processor, and a computer program stored in the memory and executable by the processor, wherein the processor is configured to, when executing the computer program, perform operations that comprise:

obtaining a current broadcast message broadcast by the terminal equipment, wherein the current broadcast message comprises current broadcast data;

performing a signature processing on the current broadcast data to determine signature information corresponding to the current broadcast data;

comparing the signature information corresponding to the current broadcast message with signature information corresponding to various valid broadcast messages received by the gateway to determine whether a first valid broadcast message being the same as the current broadcast message is presented in the various valid broadcast messages;

determining, when the first valid broadcast message is presented, that the current broadcast message is a duplicate broadcast message, and discarding the current broadcast message; and determining, when the first valid broadcast message is not presented, that the current broadcast message is a newly-received valid broadcast message, wherein before performing the signature processing on the current broadcast data to determine the signature information corresponding to the current broadcast data, the operations further comprise:

determining whether the current broadcast message meets a pre-filtering rule; and discarding the current broadcast message when the current broadcast message meets the pre-filtering rule.

10. A non-transitory computer-readable storage medium in which a computer program is stored, wherein the computer program, when being executed by a processor, enables the following operations to be performed that comprise:

obtaining a current broadcast message broadcast by a piece of terminal equipment, wherein the current broadcast message comprises current broadcast data;

performing a signature processing on the current broadcast data to determine signature information corresponding to the current broadcast data;

comparing the signature information corresponding to the current broadcast message with signature information corresponding to various valid broadcast messages received by a gateway to determine whether a first valid broadcast message being the same as the current broadcast message is presented in the various valid broadcast messages;

determining, when the first valid broadcast message is presented, that the current broadcast message is a duplicate broadcast message, and discarding the current broadcast message; and determining, when the first valid broadcast message is not presented, that the current broadcast message is a newly-received valid broadcast message, wherein before performing the signature processing on the current broadcast data to determine the signature information corresponding to the current broadcast data, the operations further comprise:

determining whether the current broadcast message meets a pre-filtering rule; and discarding the current broadcast message when the current broadcast message meets the pre-filtering rule.

11. The terminal equipment according to claim 9, wherein the current broadcast message further comprises a MAC address corresponding to the current broadcast message, and the MAC address is a MAC address of the terminal equipment, a cache of the gateway comprises various data storage units corresponding to MAC addresses of the various valid broadcast messages, and the operation of comparing the signature information corresponding to the current broadcast message with the signature information corresponding to the various valid broadcast messages received by the gateway to determine whether the first valid broadcast message being the same as the current broadcast message is presented in the various valid broadcast messages, comprises:

determining whether a first data storage unit matching with the MAC address that corresponds to the current broadcast message is presented in the various data storage units;

comparing, when the first data storage unit is presented, the signature information corresponding to the current broadcast message with the signature information corresponding to the various valid broadcast messages stored in the first data storage unit to determine whether the first valid broadcast message is presented.

12. The terminal equipment according to claim 11, wherein after determining whether the first data storage unit matching with the MAC address that corresponds to the current broadcast message is presented in the various data storage units, the operations further comprise:

newly-creating, when the first data storage unit is not presented, a data storage unit corresponding to the MAC address that corresponds to the current broadcast message;

storing the current broadcast message as the newly-received valid broadcast message in the data storage unit that is newly-created.

13. The terminal equipment according to claim 11, wherein after determining, when the first valid broadcast message is not presented, that the current broadcast message is a newly-received valid broadcast message, the operations further comprise:

storing the current broadcast message as newly-received valid broadcast data in the first data storage unit.

14. The terminal equipment according to claim 13, wherein the current broadcast message further comprises current scan time, each of the various valid broadcast messages has corresponding first scan time and latest scan time, after comparing, when the first data storage unit is presented, the signature information corresponding to the current broadcast message with the signature information corresponding to the various valid broadcast messages stored in the first data storage unit to determine whether the first valid broadcast message is presented, the operations further comprise:

updating, when the first valid broadcast message is presented, the latest scan time corresponding to the first valid broadcast message to the current scan time;

storing, when the first valid broadcast message is not presented, the current scan time, taken as the first scan time and the latest scan time corresponding to the current broadcast message, in the first data storage unit.

15. The terminal equipment according to claim 14, wherein the operation of storing the current broadcast message as the newly-received valid broadcast data in the first data storage unit comprises:

determining whether a quantity of the valid broadcast messages in the first data storage unit is equal to a quantity threshold;

sending, when the quantity of the valid broadcast messages is equal to the quantity threshold, a corresponding second valid broadcast message having an earliest valid broadcast message of the first scan time in the first data storage unit to a server, and deleting the corresponding second valid broadcast message from the first data storage unit;

storing the current broadcast message into the first data storage unit; and storing, when the quantity of the valid broadcast messages is less than the quantity threshold, the current broadcast message in the first data storage unit, and adding the quantity of the valid broadcast messages by 1.

16. The terminal equipment as claimed in claim 14, the operations further comprise:

determining a time interval between the first scan time corresponding to each valid broadcast message and a current moment;

sending a third valid broadcast message whose time interval between the first scan time and the current moment is greater than or equal to a preset filtering period to a server; and deleting the third valid broadcast message from a data storage unit where the third valid broadcast message is stored, and subtracting a quantity of the third valid broadcast message from the quantity of the valid broadcast messages corresponding to the data storage unit where the third valid broadcast message is stored.

17. The terminal equipment according to claim 9, wherein the current broadcast message further comprises any one of a MAC address corresponding to the current broadcast message, a received signal strength indication value and a broadcast type, wherein, the MAC address is a MAC address of the terminal equipment;

when the current broadcast message comprises the MAC address corresponding to the current broadcast message, the pre-filtering rule comprises a preset address range, and the operation of determining whether the current broadcast message meets the pre-filtering rule comprises:

determining, in case that the MAC address corresponding to the current broadcast message is within the preset address range, that the current broadcast message meets the pre-filtering rule;

determining, in case that the MAC address corresponding to the current broadcast message is not within the preset address range, that the current broadcast message does not meet the pre-filtering rule, or, when the current broadcast message comprises the received signal strength indication value corresponding to the current broadcast message, the pre-filtering rule comprises a preset range of the received signal strength indication value, and the operation of determining whether the current broadcast message meets the pre-filtering rule comprises:

determining, in case that the received signal strength indication value corresponding to the current broadcast message is within the preset range of the received signal strength indication value, that the current broadcast message meets the pre-filtering rule;

determining, in case that the received signal strength indication value corresponding to the current broadcast message is not within the preset range of the received signal strength indication value, that the current broadcast message does not meet the pre-filtering rule, or, when the current broadcast message comprises the broadcast type corresponding to the current broadcast message, the pre-filtering rule comprises a preset broadcast type, and the operation of determining whether the current broadcast message meets the pre-filtering rule comprises:

determining, in case that the broadcast type corresponding to the current broadcast message belongs to the preset broadcast type, that the current broadcast message meets the pre-filtering rule;

determining, in case that the broadcast type corresponding to the current broadcast message does not belong to the preset broadcast type, that the current broadcast message does not meet the pre-filtering rule.

* * * * *